Figure 1:
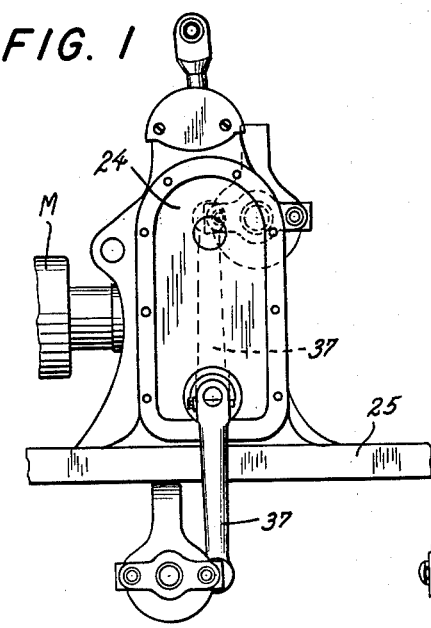

March 19, 1963 G. A. BERGFORS 3,081,645
PEDAL CRANK MECHANISM FOR EXERCISER
Filed Dec. 17, 1959 3 Sheets-Sheet 1

INVENTOR.
GORDON A. BERGFORS
BY
Dean, Fairbank & Hirsch
ATTORNEYS

March 19, 1963  G. A. BERGFORS  3,081,645
PEDAL CRANK MECHANISM FOR EXERCISER
Filed Dec. 17, 1959  3 Sheets-Sheet 2

INVENTOR.
GORDON A. BERGFORS
BY
Dean, Fairbank & Hirsch
ATTORNEYS

March 19, 1963 G. A. BERGFORS 3,081,645
PEDAL CRANK MECHANISM FOR EXERCISER
Filed Dec. 17, 1959 3 Sheets-Sheet 3
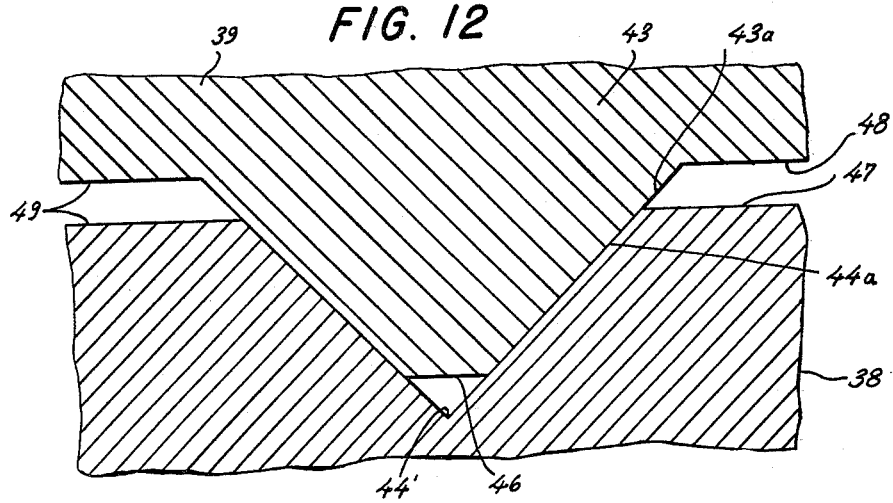
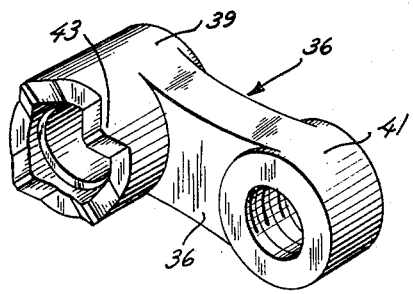
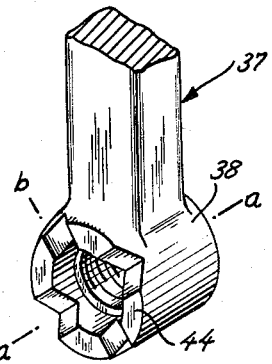
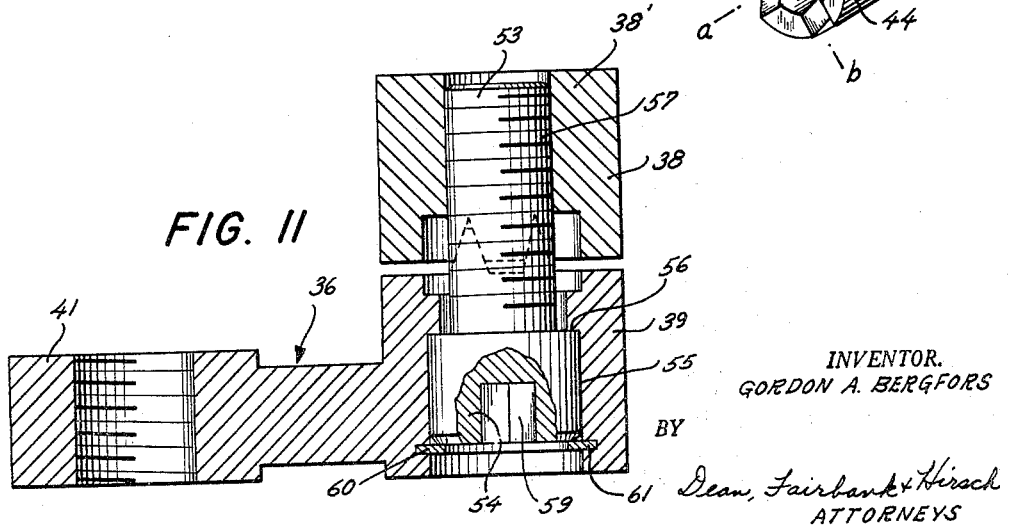
INVENTOR.
GORDON A. BERGFORS
BY
Dean, Fairbank + Hirsch
ATTORNEYS

United States Patent Office

3,081,645
Patented Mar. 19, 1963

3,081,645
PEDAL CRANK MECHANISM FOR EXERCISER
Gordon A. Bergfors, Yonkers, N.Y., assignor to Exercycle Corporation, a corporation of Delaware
Filed Dec. 17, 1959, Ser. No. 860,172
6 Claims. (Cl. 74—594.1)

The present invention relates to pedal cranks, and especially to such cranks for use in mechanisms that are designed to operate for sustained periods of time; for example, in motor-driven exercising machines or the like which impart motion to the feet and legs of the person using the machine; or, when desired, in machines adapted to be pedal driven by their user.

As conducive to a clear understanding of the invention, it is noted, that most especially in motor-driven exercising machines: the adaptation of any standard model of machine for use by persons with legs substantially longer than average, or by persons with legs substantially shorter than average, or for persons with an incapacity that limits the radius of pedal operation, has presented problems that for many years have defied solution. Where the pedal crank is made of two link sections connected together by one or more screws in selected slots through the thickness of the sections, looseness, rattling, interference in operation, breakage in use and possible injury to the user may result. Where a portion of the pedal crank is extended into a socket to which it is screwed in selected position of adjustment, like difficulties are incurred, with the necessity also of undue spreading of the legs of the user by reason of the projecting structure of the socket, for which reason expedients of the general type mentioned have proved to be unfeasible.

It is among the objects of the invention to provide for a mechanism of the character noted, a pedal crank construction that readily admits of setting for use by persons of normal size, by persons with exceptionally long legs and by persons with exceptionally short legs, or for use by persons with incapacity that limits the radius of the pedal crank, all without the need for extra or spare parts, without protruding parts or connections in regions and in manner where looseness, rattling or fracture is likely, and without involving undue spreading of the legs in use or possible injury to the person by protruding rotating parts, and which admits of ready assembly by the manufacturer or distributor of the machine to suit the needs of the customer, and with facility for readily resetting the crank pedal by the user himself to suit requirements as to length of pedal radius.

Figure 2:
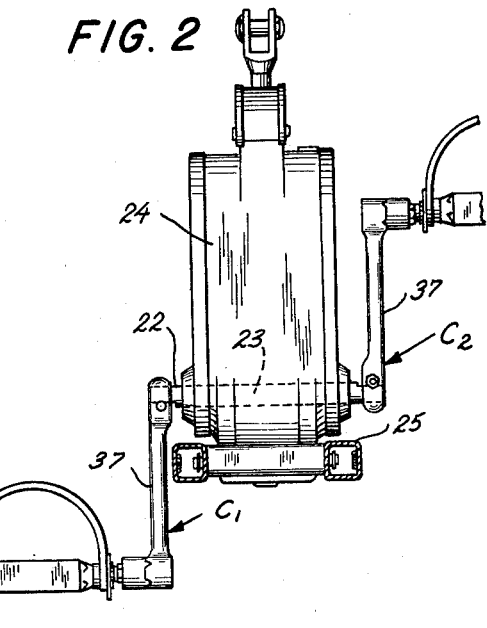
Figure 3:
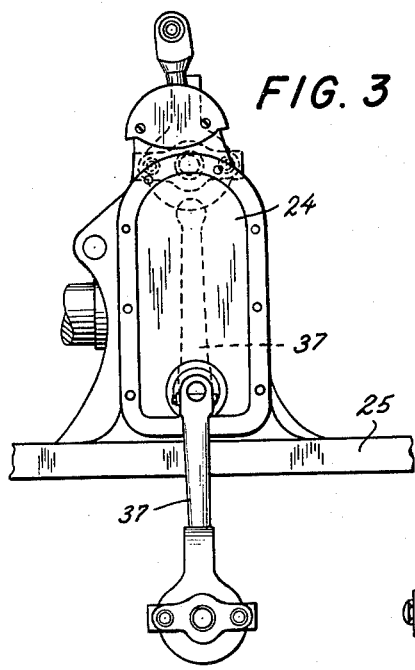
Figure 4:
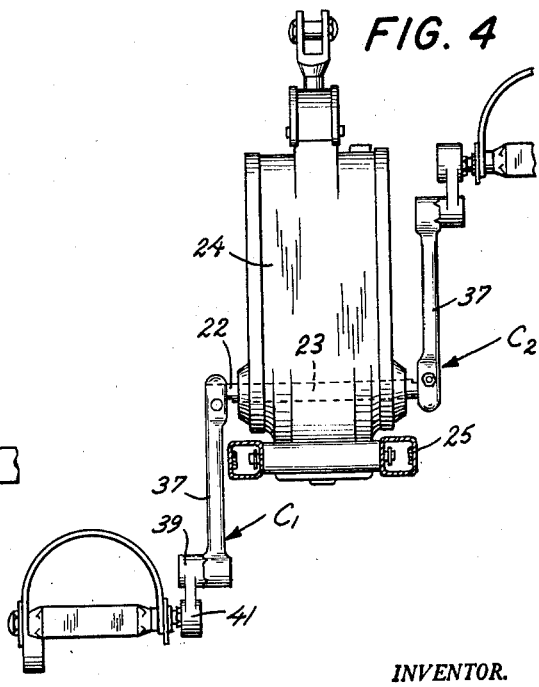
Figure 5:
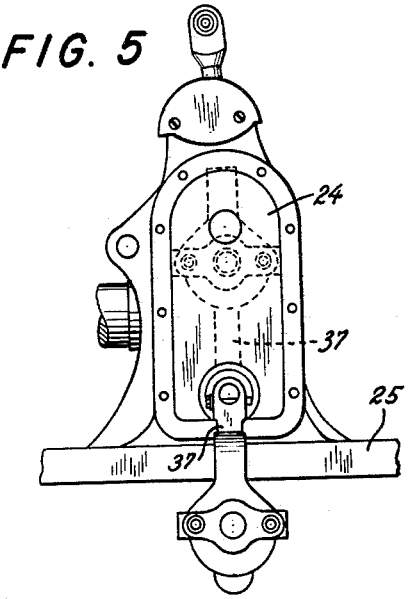
Figure 6:
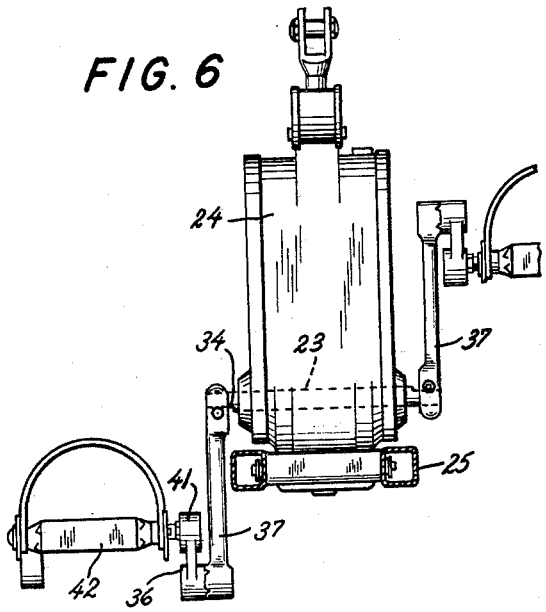
Figure 7:
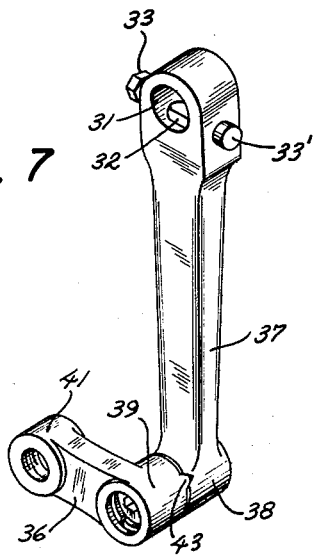
Figure 8:
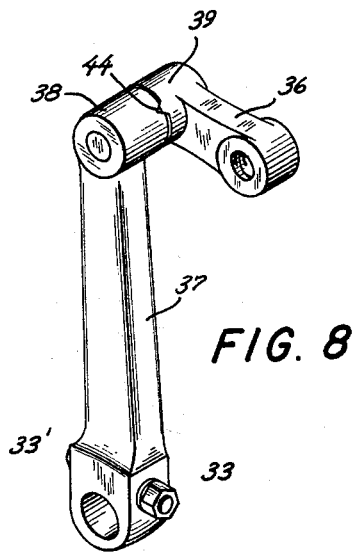

In the accompanying drawings in which are shown one or more of various possible embodiments of the several features of the invention, FIG. 1 is a side elevation showing part of the general structure of a typical machine incorporating the inventive features, FIG. 2 is a front elevation of the parts shown in FIG. 1, FIGS. 3 and 4 are similar respectively to FIGS. 1 and 2 showing the setting of the pedal crank for a person with exceptionally long legs, FIGS. 5 and 6 are views respectively similar to those of FIGS. 1 and 2 showing the setting of the pedal crank for a person with exceptionally short legs or with an incapacity that limits the radius of motion of the pedal cranks, FIG. 7 is a perspective view of the pedal crank for the left foot for the general run of users, FIG. 8 is a perspective view similar to FIG. 7 showing the pedal crank for the right foot in correct phase relation with respect to the showing of FIG. 7 as in actual use on the machine, FIG. 9 is a perspective view on a larger scale showing the link element of the pedal crank of the invention, FIG. 10 is a fragmentary perspective view of the main pedal crank member, FIG. 11 is a view in longitudinal cross-section on a still larger scale, showing the elements of FIGS. 9 and 10 assembled together, and FIG. 12 is a cross-sectional detail view greatly enlarged, showing the correlation of a tooth and associated depressions in the assembly of FIG. 11.

Referring to FIGS. 1 and 2 of the drawings, the pedal cranks $C_1$ and $C_2$ are shown mounted upon the corresponding ends 22 of pedal shaft 23, which protrude from the gear box 24 affixed to the frame 25, and which box encloses the transmission gearing (not shown) of an exercising machine that is driven by electric motor M.

The pedal crank according to the invention comprises a main pedal crank member 37, the mounted end of which has a transverse bore 31 encompassing the end 22 of the pedal shaft 23. A bolt 32 headed at 33' secures the pedal crank member 37 to shaft 23 by its nut 33. The pin 32 keys the members together in conventional manner at a flat 34 in the end of shaft 23.

The pedal cranks $C_1$ and $C_2$ at opposite sides of the gear box 24 are affixed to the pedal shaft 23 at 180° with respect to each other for normal opposite phase relation of the legs of the user.

The pedal crank includes a link 36 which is considerably shorter than the main pedal crank member 37. The link 36 is adjustably affixed to the outer end of the main pedal crank member 37 by face to face engagement between one face of the end ring 38 of the main pedal crank member 37 and the corresponding face of the end ring 39 of the link 36, in manner hereinafter set forth.

In the setting shown in FIGS. 1, 2, 7 and 8, the link 36 extends laterally, one to the right and the other to the left, from the main pedal crank member 37; in the setting of FIGS. 3 and 4 it extends outwardly beyond the main pedal crank member 37; in the setting of FIGS. 5 and 6, the link 36 extends parallel to but inwardly along the length of the main pedal crank member 37. The two component elements 37 and 36 of the pedal crank in each of the possible settings of FIGS. 1 through 6 are rigidly connected together so that the link element 36 of of the pedal crank is driven in each of said settings as a unitary part of the pedal crank and accordingly without looseness or rattle.

For the secure attachment of the link 36 to the main pedal crank member 37, so that the two elements will operate as if they were one integral pedal crank in each of the possible settings, the following construction is preferred according to the invention.

The ring 38 at the outer end of the main pedal crank member 37 and the ring 39 at the inner end of the link 36 have complementary driving conformation at their coacting faces, which are held together by a screw through the ring ends of the members 36 and 37 that clamp the rings together, as presently to be described.

The ring 41 on the outer end of the link 36 mounts the pedal 42 in conventional manner.

In a desirable embodiment, teeth 43 are on the ring 39 of the link 36 and complementary depressions 44 in the ring 38 of the main pedal crank member 37.

In a preferred embodiment there are a plurality, preferably four integral teeth protruding laterally from one of the coacting faces of rings 38 and 39 and complementary depressions 44 in the adjoining face of the other ring. In the preferred embodiment shown, the teeth 43 protrude from a face of the ring 39 of link 36, and the depressions 44 are in the adjoining face of ring 38 of the main pedal crank member 37. The teeth are of isosceles right triangular shape, and are spaced at equal intervals about the periphery of the ring face.

Two of the depressions 44 are opposed to each other along diameter a—a of the ring 38 and the other two depressions 44 are opposed to each other along diameter b—b at right angles to diameter a—a. The teeth 43 on the link 36 are also in pairs on diameters of the ring face 39 at right angles to each other, for coaction with the depressions 44 in the face of ring 38.

As best shown in FIG. 12 each of the teeth 43 is of width at its base somewhat greater than the width of the mouth of each of the depressions 44 and each of the teeth is devoid of a sharp apex, being flattened off at 46. Accordingly, when the rings 38 and 39 are clamped together, the only area of contact of the rings 38 and 39 is between each tooth 43 and its associated depression 44 and that solely along the oblique faces of the tooth 43 and the oblique sides of the depression 44. There is no contact between the flat face areas 47 and 48 of the ring faces 38 and 39 respectively, which are spaced from each other as at 49 and there is of course no contact of the tooth flattened as at 46 with the bottom portion 44' of the depression 44.

In one particular commercial embodiment shown, the diameter of each ring is 1 inch, the base width of each tooth is ⅜ inch, the mouth width of each depression is 5/16 inch, the depth of the depression is 5/32 inch and the apex of the tooth is sheared or flattened off by 1/32 inch, so that when the two rings 38 and 39 are clamped together, there will be a gap of 1/32 inch between the faces thereof, and a gap of 1/32 inch between the blunted apex 46 of the tooth and the bottom 44' of the depression. There is, therefore, assurance that when the teeth and the depressions are correctly formed as described, superlative precision in machining the flat faces of the rings is unnecessary, as would be the case were a face to face engagement of the flat areas of the rings not precluded as it is, according to the present invention.

In the embodiment shown, the screw 53 which clamps the link ring 39 in face to face engagement, with the ring 38 on the main crank member 37 is shown with a round head 54 in a corresponding socket 55 in the outer face of the link ring 39. That head seats on a circular shoulder 56 in the bottom of the socket 55. The threaded shank 57 of the screw, which desirably passes loosely through the ring 39 of the link, is screwed into the bore tapped at 38' through the ring 38 of the main pedal crank member 37. The head 54 of the screw has a polygonal socket 59 for a suitable wrench (not shown) such as an Allen wrench, by which the screw may be tightened or loosened, preferably for its head to extend below the outer face of the link 36 and for its opposite end to extend substantially flush with the outer face of the ring 38 without protrusion therebeyond. A retaining ring 60 lodged in a groove 61 in the socket 55, keeps the screw assembled to the link 37.

As best shown in FIG. 12, when the rings 38 and 39 are juxtaposed with the four teeth 43 of link 36 entering the corresponding depressions 44 in the main pedal crank member 37, the teeth in any one of the four possible settings will engage along their side walls 43ª with the walls 44ª of the depressions 44, so that the sole engagement between the rings 38 and 39 is at the side walls of the teeth 43 and the walls 44 of the depression, while the intervening flat surfaces 48 between the teeth are spaced as at 49 from the corresponding flat surfaces 47 between the depressions in ring 38 and the blunted apex 46 of the teeth are spaced as shown from the bottom of the depression in the ring 38. Thus, the driving torque between the main pedal crank member and the link is wholly between the sides of the teeth on ring 39 and the oblique surfaces of the depressions in the ring 38 which they engage.

It will be seen that by positioning the teeth on the link member 36 as shown in FIGS. 1, 2, 7 and 8, that link member 36 would extend at right angles to the length of the main pedal crank member 37, which is the setting for the general run of persons.

As shown in FIGS. 7 and 8, the links 36 extend in opposed directions on the two companion pedal cranks, which is readily accomplished by having the link on each pedal crank extending say to the side of the nut 33.

As suggested in FIGS. 1, 2, 7 and 8, the pedal 36, 37 is adequately spaced from the gear box of the mechanism and there is no danger of injury to the user and no need for undue spreading of the legs in use of the exercising machine or other mechanism to which the invention is applicable.

In the setting of FIGS. 3 and 4, the link is in a position displaced by 90° about the ring relative to the position shown in FIGS. 1, 2, 7 and 8, the teeth on the link ring 39 being in effect shifted by one notch in counter-clockwise direction with respect to the showing in FIGS. 1, 2, 7 and 8. This may be effected by loosening screw 53 and then retightening it. Accordingly, as shown in the setting of FIGS. 3 and 4, the effective length of the pedal crank has been increased.

By shifting of the link from the position shown in FIGS. 1, 2, 7 and 8 by one step in clockwise direction after loosening the screw 53, and then retightening the screw, the effective length of the pedal crank will have been shortened to the setting shown in FIGS. 5 and 6.

In each of the settings, the component parts 37, 36 of the pedal crank are rigidly secured together by the connecting screw 53 and the thrust of said screw is exerted entirely through the oblique faces of the teeth 43 against the oblique faces of the depressions 44, without danger of looseness or canting or rattling or fracture that might be incurred were part or all of the thrust exerted between the flat face regions of the rings or at the points of one or more of the teeth.

Thus, the link may be assembled to the main pedal crank member by the manufacturer of the exercising machine or other equipment in original manufacture or it may be reset in the shop of the distributor for accommodation to the particular user, or may be reset as required by the user in manner set forth, either to the position of FIGS. 3 and 4 for the long-legged user, or to that of FIGS. 5 and 6 for the short-legged user, or for a person with an affliction that demands a short pedal crank.

If desired, the two pedal cranks may be given different settings to meet special conditions.

In any such setting, the two component elements 36, 37 of the pedal crank are so securely connected together, and the engagement between the sides of the teeth and of the corresponding oblique depressions therefor, is so secure, that there can be no rattling or looseness, the crank, despite its composite construction, acting in all of its settings as if it were one integral structure.

As changes could be made in the above construction, and different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pedal crank of the type for driving the feet or legs of a person on a motor-driven exercising machine, said crank having a plurality of alternative settings of length of pedal stroke, said pedal crank comprising a main pedal crank member and a shorter extension link member, each having an end ring, said rings being in face to face engagement with each other and having respectively a number of interlocking teeth and depressions in registering relation at said contacting faces, and a screw clamping said rings together, said screw having a head, a seat for said head, near the outer face of one of said rings, at least the other of said rings being tapped for accommodating the corresponding threaded length of the screw, one of said juxtaposed ring faces having four equidistant teeth protruding laterally therefrom and the other having four corresponding depresessions for accommodation of said teeth, to permit assembly of the link to the main crank pedal member in any of four positions, viz., (a) as an extension to the main pedal crank member, (b) for placement in opposition to the direction of extension, (c) in position extending laterally of the length of said main crank pedal member to the right or (d) in position extending laterally of the length of said main crank member to the left.

2. The combination recited in claim 1 in which the teeth are shaped as equilateral right triangles, each with a blunted apex and the base of each tooth is wider than the mouth of each depression to assure seating of the sides of the teeth against the corresponding sides of the corresponding depressions, with slight spacing of the rings from each other at the regions between successive teeth, for secure driving mount of the link with respect to the main pedal crank member in each of the four possible settings of the link.

3. A pedal crank of the type for driving the feet or legs of a person on a motor-driven exercising machine, said crank comprising a main pedal crank member having a ring unitary therewith at the end thereof nearest the pedal, said ring having four driving conformations at one face thereof, a link shorter than the pedal crank member, having a ring at one end thereof with conformation at one face complementary to those on the ring of the main pedal crank member, said conformations on each of the rings being equidistant peripherally of the rings and positioned on diameters at right angles to each other and which diameters are at angles of 45° to the length of the main pedal crank member, said complementary members constituting respectively teeth on one of the rings, each in the form of an isosceles right angle triangle, with a blunted apex and each complementary conformation on the other ring being an isosceles right angular depression the base of each tooth being wider than the mouth of each depression, whereby when the two rings are placed in face to face relation with the teeth of one resting in the corresponding depression of the other in any of the four possible positions and the screw tightened, the assembly constitutes a rigid pedal crank in any one of the four possible positions of the link relative to the main pedal crank member.

4. In a motor-driven exercising machine of the type having a pair of motor-driven pedals with pedal cranks protruding from opposite sides of a transmission box upon which they are affixed at angle of 180° with respect to each other; the combination in which each pedal crank has a main pedal crank member and a shorter link member at the outer end thereof, means rigidly connecting the link member to the main pedal crank member in any of four possible relations, namely, as an extension or increase in the effective length of the pedal crank, a position opposed to such extension and constituting a corresponding reduction in the effective length of the pedal crank and a position at right angles to the main pedal crank member at the right or at the left, the effective driving connection between the main pedal crank member and the link comprising a ring at the outer end of the main pedal crank member having a face, a ring on the corresponding end of the link member, said rings having faces in engagement with each other, one of said rings having four isosceles right triangular teeth protruding therefrom with blunted apices, the other ring having depressions therein of right isosceles triangular form, with relatively sharp apices, the base of said teeth being wider than the mouths of said depressions, the said elements on the ring of the main pedal crank member being along ring diameters at right angles to each other and at angles of 45° to the length of the main pedal crank member, and means rigidly securing the link to the main pedal crank member in any of its four possible positions, said means comprising a screw having a head, a seat therefor in the link, the ring of the main pedal crank member being tapped to accommodate the corresponding length therein of the screw shank, whereby the driving connection to the link is effected at the lateral faces of the teeth and depressions and the intervening portions of the ring faces are free from physical contact with each other, each of the links having means at its outer end for mounting the associated pedal.

5. In a motor-driven pedal-type exercising machine, an adjustable-length pedal crank comprising a first crank arm having a hub at one end, a second crank arm relatively shorter than said first crank arm, said second crank arm having a hub at one end and a pedal rotatably secured to its other end, one of said hubs having a plurality of generally wedge-shaped projections spaced apart symmetrically on one of its surfaces, the other of said hubs having at least an equal number of mating grooves on one of its surfaces, each of said projections being shaped to allow said hubs to contact one another only on the side surfaces of said projections and said grooves when said hubs are connected together with said projections wedged into said grooves, and clamping means for wedging said projections into said grooves and securing said hubs together, said clamping means being adapted to release said hubs from contact with one another, thereby allowing them to be shifted with respect to one another to change the length of said pedal crank, and to clamp them together after said change in length has been effected.

6. A pedal crank as set forth in claim 5 wherein the tip of each of said projections is cut off to prevent said projections from touching the deepest extremity of said grooves when said projections are wedged into said grooves, each of said projections also having a base wider than the greatest width of the grooves so that the surfaces of said hubs do not touch one another when said projections are wedged into said grooves.

References Cited in the file of this patent

UNITED STATES PATENTS

| 558,463 | Bascom | Apr. 14, 1896 |
| 579,732 | Adams | Mar. 30, 1897 |
| 1,526,999 | Mizner et al. | Feb. 17, 1925 |
| 2,221,962 | Bergfors | Nov. 19, 1940 |
| 2,453,771 | White et al. | Nov. 16, 1948 |
| 2,922,317 | House | Jan. 26, 1960 |
| 2,971,619 | Koslo | Feb. 14, 1961 |

FOREIGN PATENTS

| 21,035 of 1898 | Great Britain | May 13, 1899 |
| 209,161 | Great Britain | Jan. 3, 1924 |
| 231,633 | Switzerland | Mar. 31, 1944 |
| 513,828 | Canada | June 14, 1955 |